Aug. 16, 1932.  G. R. SHAW  1,871,750

SPEED REGULATING SYSTEM

Filed Jan. 25, 1928

INVENTOR
George R. Shaw
BY
ATTORNEY

Patented Aug. 16, 1932

1,871,750

UNITED STATES PATENT OFFICE

GEORGE R. SHAW, OF WILKINSBURG, PENNSYLVANIA, ASSIGNOR TO WESTINGHOUSE ELECTRIC & MANUFACTURING COMPANY, A CORPORATION OF PENNSYLVANIA

SPEED REGULATING SYSTEM

Application filed January 25, 1928. Serial No. 249,296.

This invention relates generally to control systems and more particularly to control systems for controlling the operation of motor-driven saw-feed carriages for hot or cold saws that are utilized for cutting metal in various forms.

Because of the ever-increasing use of structural-steel members for building purposes, it is desirable to provide mechanical means for cutting the various lengths of finished product as it comes from the rolling mill into accurate lengths suitable for immediate utilization. Rotating saws suitable for either hot or cold sawing operations are especially desirable for performing such operations where operating economy and accuracy in operation are important.

Heretofore, various forms of driving equipments and control systems have been used in connection with the operation of cutting machines of this type and, since it has always been desirable to control the rate of feed of the cutting mechanism in accordance with the resistance encountered, the easiest possible method was to almost entirely utilize direct-current motors as a driving and feeding means for the cutting mechanism. It has been the usual practice to control the rate of movement of the carriage which advances the cutting mechanism into the work by varying the excitation of the feed motor. One suggested method is to connect the field winding of the feed motor in series relation with the motor which operates the cutting mechanism or to resort to various forms of direct-current relays, interposing them in the circuit of the main motor to thereby affect the variation of the excitation of the feed motor.

At the present time, it is more desirable to utilize alternating-current motors for such applications, especially for rotating the cutting mechanism or saw and, therefore, previous control systems are not applicable; or if so, are very inadequate to properly satisfy the much changed and more exacting operating requirements.

It is, therefore, one object of this invention to provide a control system of the above-described character which shall be simple and efficient in operation and readily and economically manufactured and installed.

A more specific object of the invention is to provide for controlling the speed of the feed-carriage motor in accordance with the load imposed upon a saw-rotating motor.

Another object of the invention is to provide for controlling the speed of the feed-carriage motor to maintain a substantially constant load upon a saw-rotating motor as the resistance to the saw is varied by the metal which is being worked.

Figure 1:
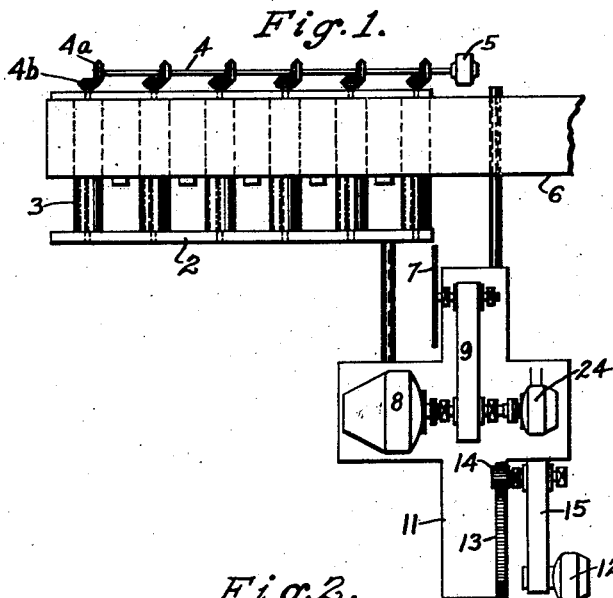
Figure 2:
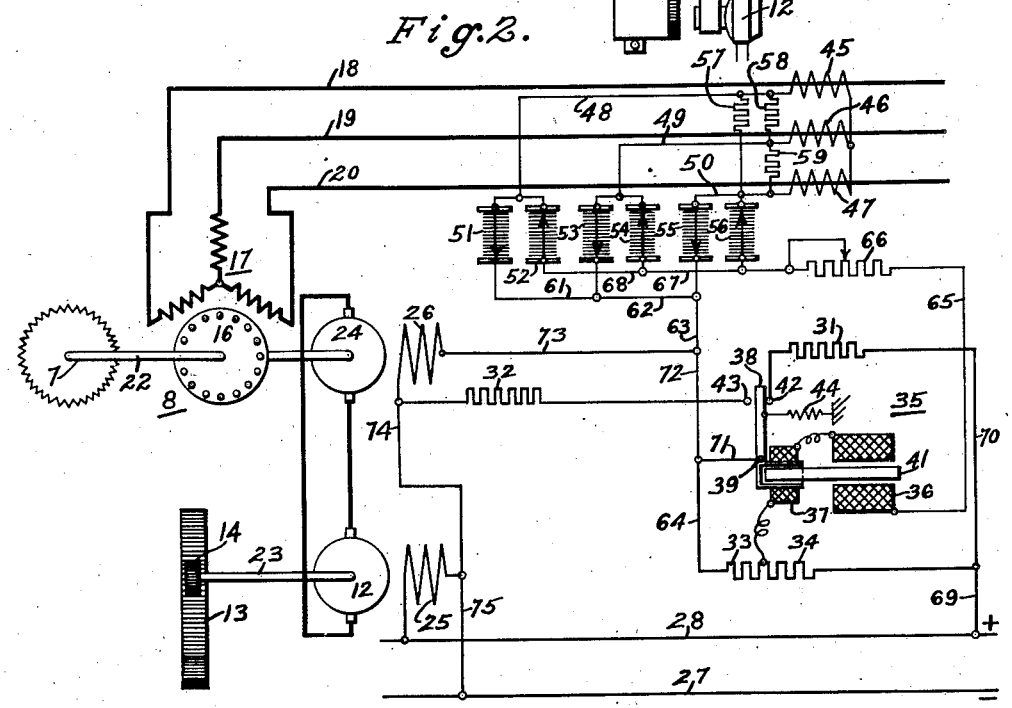

Other objects of the invention will become evident from the following detail description, taken in connection with the accompanying drawing, in which, Figure 1 is a plan view of a metal-sawing machine to which the present invention may be applied, and Fig. 2 is a diagrammatic view of control circuits and apparatus embodying the invention.

According to Fig. 1, the metal-cutting machine illustrated, which is known in the trade as a hot or cold saw comprises the usual roll table 2 provided with a plurality of feed rolls 3. The rolls 3 may be driven in any approved manner, and, for convenience in illustration, a shaft 4, extending longitudinally of the table, is shown, and a number of bevel gear wheels 4a are mounted upon it and disposed to mesh with bevel gear wheels 4b provided on the ends of the rolls. The operation of the shaft 4 may be effected by a motor 5.

The movement of the metal stock 6 into the desired position on the table 2 may thus be effected by operating the motor 5. Since the method of controlling the operation of the roll-actuating motor 5 is of small consequence in connection with this invention a suitable control system therefor has been omitted to further simplify the drawing.

In order to cut the metal stock 6, a rotating saw 7 is disposed to be driven by a motor 8 through the agency of a belt 9.

The saw 7 and the motor 8 are mounted upon a feed carriage 11 which may be moved, relative to the work, to perform cutting operations.

The actuation of the carriage 11 is effected by a direct-current motor 12, to which it is connected by a rack and pinion drive, as shown. The rack 13 is mounted upon the carriage base 11 and meshes with a pinion 14, which is driven by the motor 12 through a belt 15.

Reference may now be had to Fig. 2 of the drawing, in which like reference numerals are used to designate parts corresponding to those shown in Fig. 1.

The saw-rotating motor 8 is provided with a squirrel cage rotor 16 and a star-connected polyphase stator winding 17. For operating the motor 8, a source of polyphase power, comprising line conductors 18, 19 and 20 is provided. Since the flow of power to the motor 8 may be controlled in any well-known manner, a suitable control switch is not shown.

In the interests of simplicity of illustration, the rotatable saw 7 is, in this view, shown mounted upon the motor shaft 22. Likewise, the pinion 14, which is disposed to engage the rack 13 of the saw 11, is shown mounted on the shaft 23 of the saw-carriage motor 12.

The direct-current saw-carriage motor 12 is disposed to be energized from a suitable direct-current generator 24 which, in this embodiment of the invention, is operated from the opposite end of the motor shaft 22.

The saw-carriage motor 12 and the generator 24 are provided with separately excited shunt field windings 25 and 26, respectively, which may be energized from any suitable source of direct-current power. However, in this particular embodiment of the invention, the constant-potential source of direct-current power is illustrated as line conductors 27 and 28.

In order that the objects of the invention may be more readily understood, a detailed description of the operation of the machine in accordance with the invention will now be set forth.

Assuming that the saw-rotating motor 8 is operating and the metal stock 6 is in the proper position on the roll table 2, then, in order to make a cut, the saw carriage 11 is advanced towards the work from the full return position shown.

In order to control the excitation of the generator 24 and, consequently, the power delivered to the saw-carriage motor 12, a plurality of resistors 31 to 34, inclusive, are disposed to be connected in the field circuit of the generator 24, in various combinations, to vary the voltage impressed upon the field winding 26, as will be explained in detail hereinafter.

Since it is desirable to advance the saw 7 into the work 6 at a rate which will maintain the load upon the saw-rotating motor 8 at a substantially constant predetermined or critical value, a voltage regulator 35 is provided for controlling the excitation of the generator field winding 26 and, therefore, the voltage of the generator 24 and the speed of the motor 12.

The voltage regulator 35 is of a well-known direct-current-operated vibrating type, comprising a fixed or stationary coil 36 and a movable coil 37. As shown, the movable coil 37 is carried by a cylindrical sleeve portion of the movable contact arm 38, which is pivotally mounted at an intermediate point 39. Both of the coils 36 and 37 are mounted concentric to the iron core 41. The movable or vibrating contact member 38 is disposed to engage fixed contact members 42 and 43 and is biased to engagement with the contact member 42 by the spring 44, as shown.

Operation of the regulator is obtained by energizing the operating coils 36 and 37, which are connected in series relation, to a predetermined degree, whereupon the flux reaction between the coils tends to rotate the movable coil 37 in a counter-clockwise direction, thereby actuating the movable contact member 38 to the left, as viewed in the drawing, into engagement with the stationary contact member 43, against the force exerted by biasing spring 44.

It will be readily understood that, by varying the spring tension, the desired operation of the regulator may be obtained in response to different values of current flowing in its operating coils.

In order that the voltage regulator shall function in accordance with the load upon the saw motor 8, the operating coils 36 and 37 are disposed to be energized from the motor circuit. It will be observed that a plurality of current transformers 45, 46 and 47, are connected in the polyphase power leads 18, 19 and 20, the corresponding terminals of their secondary windings being star-connected, as shown. Therefore, when the opposite terminals of the secondary windings of the current transformers 45, 46 and 47 are connected in polyphase relation, such, for example, as by conductors 48, 49 and 50, alternating currents flow in the secondary circuit thus formed.

Since it is necessary to supply direct current for the operation of the voltage regulator 35, a plurality of rectifier units 51 to 56, inclusive, are connected between the current-transformer secondary circuits comprising line conductors 48, 49 and 50, and the regulator coils 36 and 37. Any suitable type of rectifier unit may be utilized for this purpose, but the preferred form as illustrated in this embodiment of the invention, is a copper-oxide rectifier of well-known character. Each rectifier unit comprising a pile of copper-oxide-coated copper discs, through which current may pass in only one direction.

It will be observed that the rectifier units are connected in pairs to each of the current-transformer secondary leads 48, 49 and 50, also that the units 51, 53 and 55 are connected together on the opposite side to form one group, and units 52, 54 and 56 to form another group, these groups being thus adapted to supply direct current to the voltage regulator 35.

As the entire amount of current delivered by the secondary windings of the current transformers 45, 46 and 47 is not required for the successful operation of the voltage regulator 35, a plurality of resistors 57, 58 and 59 are connected in delta relation across the secondary windings, thereby forming paths through which a greater portion of the secondary current is segregated, leaving only a very small portion to be rectified and utilized in the operation of the regulator.

As hereinbefore mentioned, it is desirable to maintain the load upon the saw-rotating motor at a substantially constant value, and therefore, the voltage regulator 35 is so adjusted that its vibrating contact member 38 will float between the fixed contact member 42 and 43, when the direct-current flowing through the regulator operating coils corresponds to the predetermined or critical value of saw-rotating current flowing in the conductors 18, 19 and 20.

It will be readily understood that, until the carriage 11 reaches a position where the saw 7 will engage the work 6, a very light load will be imposed upon the motor 8 and, therefore, the rectified direct-current flowing in the voltage-regulator-operating circuit is small. The regulator-operating current flows from the rectifier units 51, 53 and 55 in the direction designated by the arrows, through conductors 61, 62, 63, 72 and 64, resistor 33, coils 37 and 36, conductor 65, variable resistor 66, conductors 67 and 68 and through the rectifier units 52, 54 and 56. Since the magnetic force set up by this amount of current flowing in the regulator coils 36 and 37 is not sufficient to overcome the force exerted by the coil spring 44, the vibrating contact member 38 is maintained in engagement with the fixed contact member 42, as shown.

Excitation current for the generator 24 flows from the positive line conductor 28 through conductors 69 and 70, resistor 31, contact member 42, the vibrating contact member 38, conductors 71, 72 and 73, shunt field winding 26, and conductors 74 and 75 to the negative line conductor 27. In this instance, the resistor 31 is paralleled by the resistors 33 and 34 through a circuit extending from the conductor 69, through the resistors 34 and 33 and conductor 64, to the energized conductor 72.

In this particular instance, the paralleling of the resistor 31 with resistors 33 and 34 decreases the resistance of the generator field circuit and, consequently, the voltage developed by the generator 24 is increased. The feed-carriage motor 12, being connected in closed-circuit relation with the generator 24, immediately increases its speed and advances the saw carriage 11 at its maximum rate.

As the rotating saw 7 engages the work 6, a greater load will be imposed upon the saw-rotating motor 8 and, because of the rate of movement of the saw carriage 11, the saw-motor load will quickly reach the predetermined or critical value. In this event, the rectified current flowing in the regulator coils 36 and 37 is sufficient to cause the vibrating contact member 38 to be actuated to the left into engagement with the fixed contact member 43. A new field-excitation circuit is accordingly established which may be traced from the line conductor 28, through conductor 69, resistors 34 and 33, conductors 64, 72 and 73, shunt field winding 26 and conductors 74 and 75, to the negative supply conductor 27.

When the vibrating member 38 thus engages the fixed contact member 43, a circuit is established from the energized conductor 64, through conductor 71, vibrating member 38, fixed contact member 43, and resistor 32 to the energized conductor 74. It will be observed that this circuit parallels the shunt field winding 26 of the generator 24.

Since all the exciting current which flows in the shunt field winding 26 and the resistor 32 must necessarily flow through the resistors 33 and 34, the voltage drop across the resistors 33 and 34 will be increased and, therefore, since the source comprising line conductors 27 and 28 is a constant-potential source, the voltage impressed upon the field winding 26 is correspondingly reduced. The voltage developed by the generator 24 and the speed of the feed motor 12 are, accordingly, decreased thereby reducing the load on the saw-rotating motor 8.

It will be readily understood that the vibrating action of the regulator 35 effects a gradual change in the voltage developed by the generator 24, when operating, to either raise or lower the speed of the feed motor 12 and, consequently, no hunting action of the mechanical parts occurs.

In order to insure continuous vibration of the regulator movable member 38 when making contact with either of the fixed contact members 42 and 43, the operating circuit of the regulator is coupled to the generator-excitation circuit in such manner as to make the resistor 33 common to both. Since the voltage supplied by the rectifiers is practically constant, with constant load on the saw, a rise in voltage across the resistor 33 will cause a drop in voltage across the remainder of the regulator circuit comprising coils 36 and 37. The opposite is true in case the voltage drop across the resistor 33 is reduced. Since the voltage drop across the resistor 33 increases when the vibrating member 38 engages the contact member 43, the voltage drop across the regulator coils 36 and 37 decreases, which permits the contact members to be quickly disengaged, thus causing the contact member 38 to vibrate, making extremely brief contacts until the load upon the saw-rotating motor 8 is reduced to the desired value.

The opposite course of action occurs when the vibrating member 38 engages the fixed contact member 42. In this event, the voltage drop across the resistor 33 is reduced, thereby increasing the voltage drop across the regulator coils 36 and 37, with a corresponding increase of current, thereby causing an immediate disengagement of the contact members, as hereinbefore explained.

It will be readily understood that, when the rate of movement of the saw carriage 11 is such as to obtain the predetermined or critical load upon the saw motor 8, the vibrating member 38 of the regulator 35 floats freely between the fixed contact members 42 and 43, engaging and making vibratory contact with each as the resistance to the rotating saw 7 varies sufficiently to require a correction in speed of the feed motor.

Since certain changes may be made in the above-described system and different embodiments of the invention may be made without departing from the scope thereof, it is intended that all matter contained in the above description or shown in the accompanying drawing shall be interpreted as illustrative and not in a limiting sense.

I claim as my invention:

1. In a power system, in combination, an alternating-current motor for operating a work device, a direct-current generator driven by the alternating-current motor, said generator being provided with a separately excited field winding, a direct-current motor connected to the generator, said direct-current motor being disposed to control the load imposed upon the alternating-current motor by the work device, a plurality of resistors disposed to be connected in circuit with the generator field winding, a vibrating relay having contact members for providing different resistor combinations in the generator field winding circuit, and means for effecting the operation of the said vibrating relay in accordance with the load upon the alternating-current motor, said means comprising a plurality of current transformers having their primary windings connected in circuit with the said alternating-current motor, a plurality of resistors connected across the secondary windings, and a plurality of rectifier units interposed between the resistors and the vibrating relay to provide direct-current energy for operating said vibrating relay.

2. In a power system, in combination, a motor-generator set, said motor generator set comprising an alternating-current work motor and a direct-current generator, a direct-current motor connected to the generator for regulating the load on the work motor, a field winding for the generator, a constant-potential power source connected to said field winding, a plurality of resistors for controlling the current flowing in the generator field winding, a voltage regulator for controlling the functioning of said resistors, a plurality of current transformers having their primary windings connected in the alternating-current motor circuit and their secondary windings connected in star relation to a plurality of resistors connected in closed-circuit relation and a plurality of unidirectional current devices connected to the said resistors at the same points as the secondary windings are connected to provide a unidirectional energizing current for the voltage regulator.

3. In a power system, in combination, a motor-generator set, said motor-generator set comprising an alternating-current work motor and a direct-current generator, a direct-current motor connected to the generator for controlling the load on the work motor, a field winding for the generator, a constant-potential power source connected to said field winding, a plurality of resistors for controlling the current flowing in the generator field winding, a voltage regulator operable to connect the resistors in different predetermined combinations, a plurality of current transformers for controlling the voltage regulator, said current transformers having their primary windings connected in the alternating-current-motor circuit and their secondary windings connected in star-circuit relation, a plurality of resistors connected in delta-circuit relation to the secondary windings to provide circuits for circulating secondary currents, and a plurality of rectifier units connected between the voltage regulator and the delta-connected resistors, thereby to provide direct-current energy proportional to the load current of the alternating-current work motor for controlling the operation of the voltage regulator.

In testimony whereof, I have hereunto subscribed my name this 23rd day of January, 1928.

GEORGE R. SHAW.